Aug. 28, 1962   D. H. E. GENTER   3,050,830
METHOD OF SPINNING AGRICULTURAL DISCS
Filed Nov. 12, 1957   4 Sheets-Sheet 2
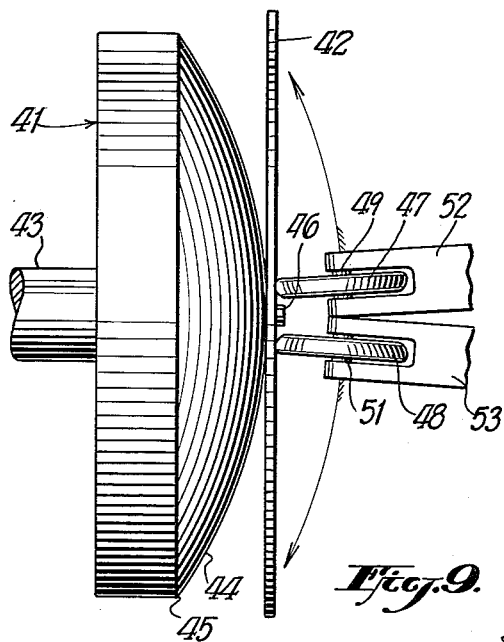
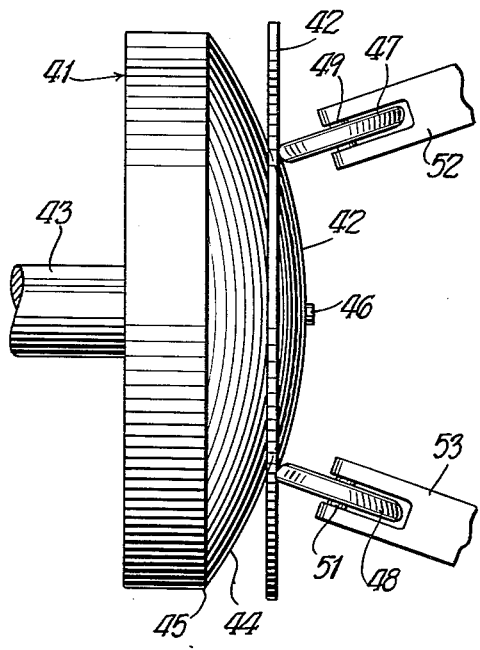
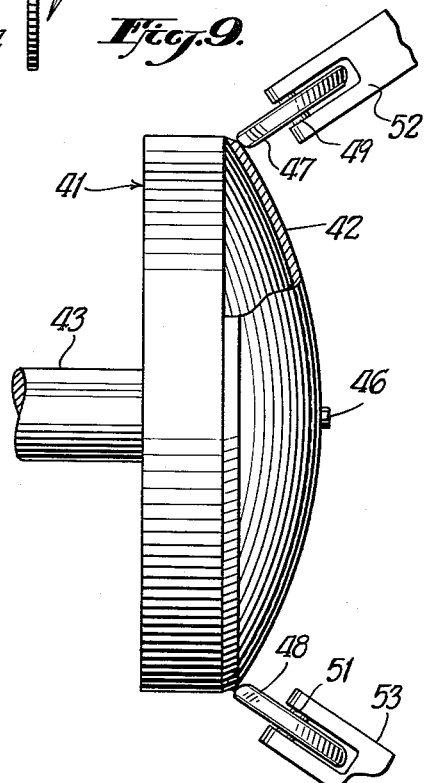
INVENTOR.
DAVID H.E. GENTER.
BY
*Ward, Neal, Haselton, Orme & McChannon*
ATTORNEYS.

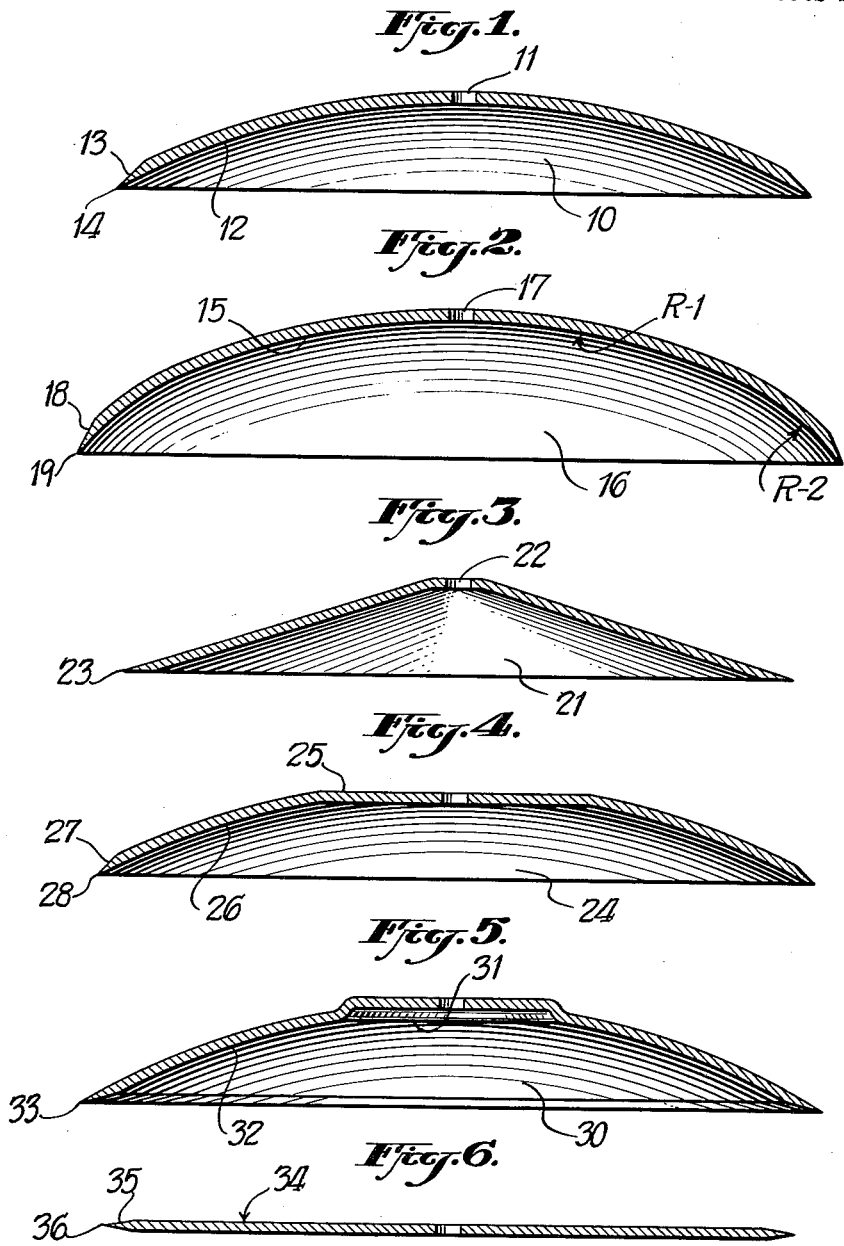

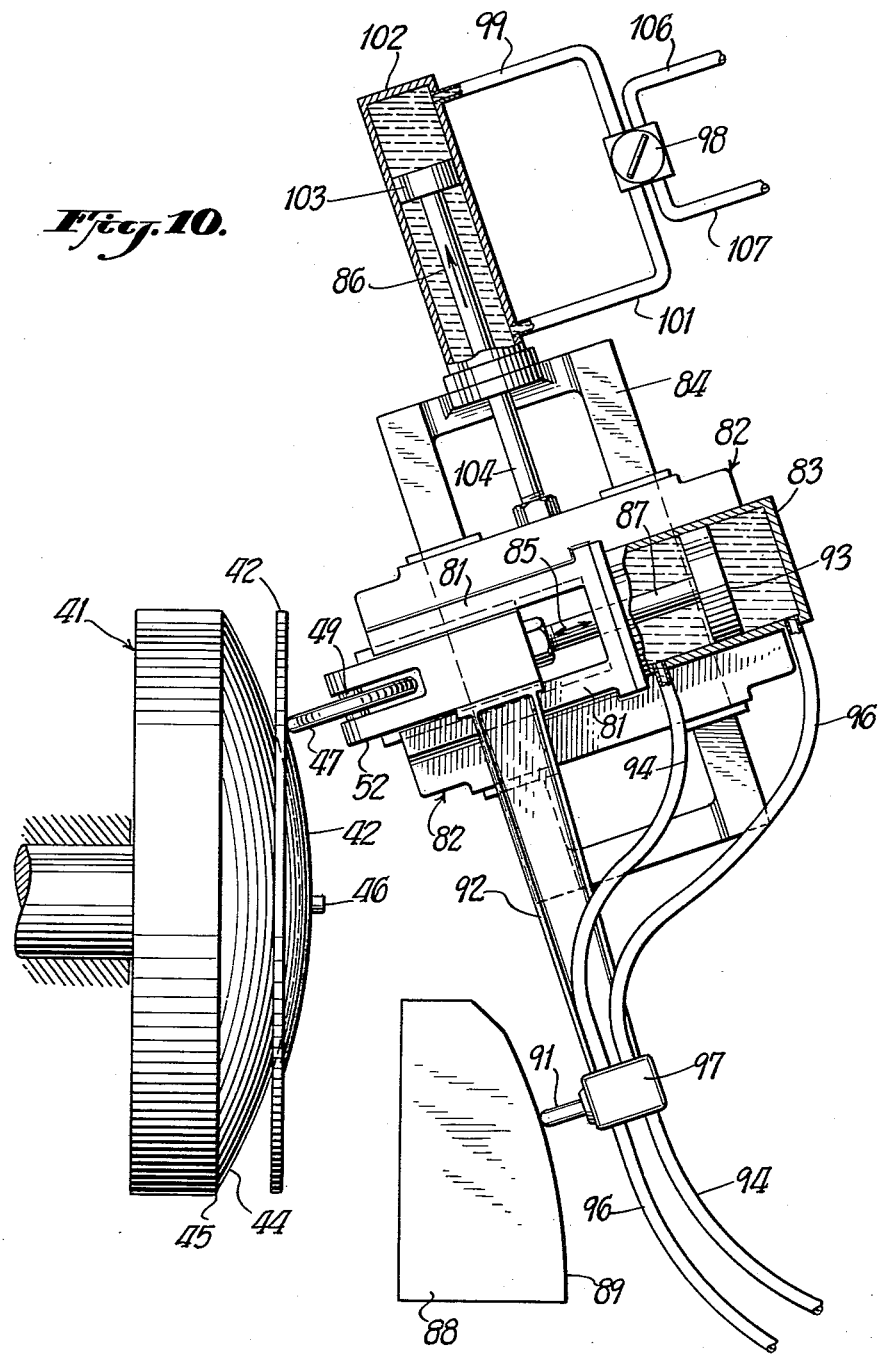

Aug. 28, 1962 D. H. E. GENTER 3,050,830
METHOD OF SPINNING AGRICULTURAL DISCS
Filed Nov. 12, 1957 4 Sheets-Sheet 4
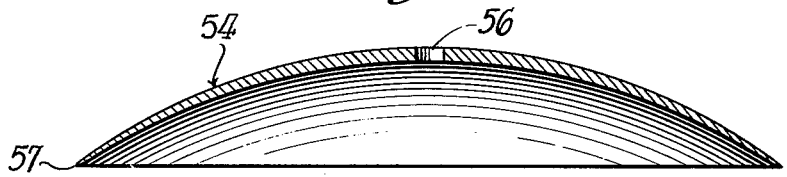
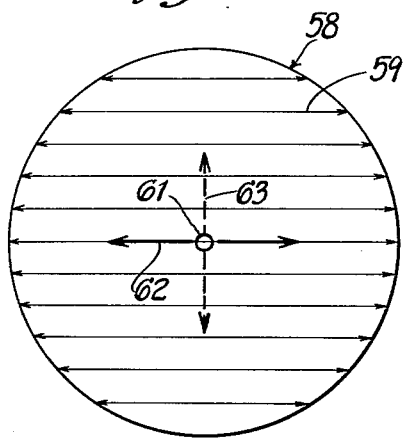
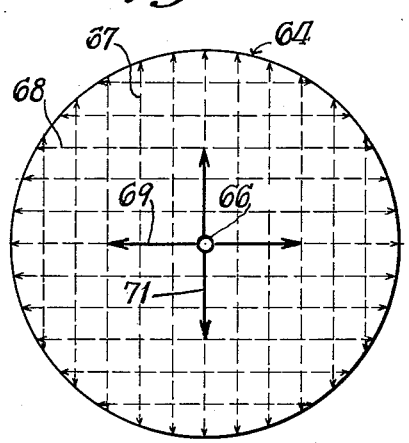
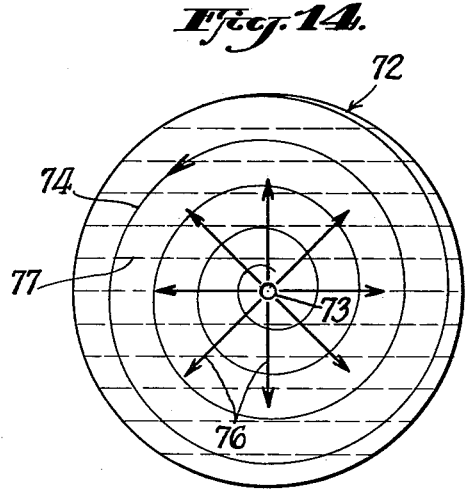
INVENTOR.
DAVID H. E. GENTER.
BY
ATTORNEYS.

3,050,830
METHOD OF SPINNING AGRICULTURAL DISCS
David H. E. Genter, Sewickley, Pa., assignor to Crucible Steel Company of America, Pittsburgh, Pa., a corporation of New Jersey
Filed Nov. 12, 1957, Ser. No. 695,913
1 Claim. (Cl. 29—148.3)

This invention relates to the production of agricultural discs. More particularly, the invention relates to an improved method of forming such discs.

Agricultural discs such as plow or harrow discs are made of a suitable material, such as steel, which has generally but not invariably formed or dished to a shape such that the center portion does not lie in the same plane as the outer periphery. This forming or dishing is most often of such a nature as to render the surface of the disc spherical in shape although this shape may also be spheroidal, that is, somewhat elliptical and/or conical or any one of these shapes or combinations thereof. Further, the disc may be truncated in such a manner as to produce a shape generally as described above but having a flat portion near the center. In addition, it is generally the practice to produce these discs with a beveled or tapered outer periphery the purpose of which is to render the outer edge sharp or somewhat so in order to give it a cutting action and thus facilitate its penetration into the soil.

Conventional practice in forming agricultural discs requires that a flat blank or work piece substantially circular in contour be punched out of suitable material to the proper predetermined dimensions. Either at the same time or immediately thereafter the center is pierced with the proper sized center hole and any other punching or piercing as may be necessary, such as mounting holes, etc., is performed as required. The flat blank is then heated to a suitable temperature and the area around the outer periphery is beveled or tapered to the predetermined and desired shape and thickness by means of suitable rolls. It is possible, but not generally desirable, to perform the beveling or tapering without prior heating. The beveled or tapered blank is then placed directly into suitable forming dies to produce the desired dished or concave shape. If desired, the blank may be reheated prior to being placed in the forming dies. The formed disc thus produced may or may not be subjected to an appropriate heat treatment in order to attain desired physical properties such as hardness, toughness, resistance to shock and abrasion, etc. If desired, the beveled or tapered edge of the formed disc may be subjected to further shaping and sharpening by abrasive grinding, machining, rolling etc. Under certain conditions the initial beveling or tapering operation may be omitted and the disc used without sharpening of the outer peripheral region or the sharpening may be performed entirely by abrasive grinding, machining or rolling without the initial beveling or tapering operation.

It is obvious from the manner in which an agricultural disc functions and the degree and nature of the stresses and strains as well as the impact and abrasion to which it is subjected during its use and in the performance of its function that it should possess reasonably good strength properties and characteristics in all directions radially from the disc center. This is true particularly of a plow disc and is also true, although to a lesser degree, of a harrow disc. These strength properties should be of such a nature and magnitude that the disc will not be substantially weaker in one direction than in another.

Experience has shown that frequently steel which has been rolled from the ingot all the way to finished gage with the rolling being done all in one direction will exhibit marked differences in strength properties and characteristics depending on whether stresses are being applied or the properties are being tested or measured parallel to or transverse to the direction of rolling. Such steel is generally known as strip rolled steel. Strip rolled steel is said to have directionality or possess directional properties. Such steel will often tend to split and tear more readily in a direction parallel to the direction of rolling than in a direction which is transverse to the direction of rolling.

The directionality of strip rolled steel can be at least partially overcome by cross rolling the steel. Cross rolled steel is rolled partly in one direction and partly transverse to the first direction so as to obtain substantially equal amounts of working or reduction of metal in both directions. Agricultural discs made from cross rolled steel are found to have substantially less tendency to exhibit directionality than discs made of strip rolled steel. This is true when they are being tested or are being subjected to the more or less severe stressing and impact hazards which are encountered on occasions and is also true at times even in the normal and routine use of the implement in the field.

It is an object of this invention to provide a new, novel and improved method for producing agricultural discs. Specifically, the invention deals with a method for forming these discs in which the required shape is produced and at the same time the desired physical properties are imparted to the metal in the disc.

According to one aspect of this invention an agricultural disc may be produced by conforming a work piece blank to the surface of a rotating mandrel to form the disc.

Conforming the work piece blank to the surface of the mandrel can be accomplished by forcing the metal of the work piece blank against the mandrel by means of one or more suitable rollers or work rolls which are made to bear against the work piece with considerable pressure. With the mandrel rotating and the work rolls pressing against the work piece in such a manner as to force it against the mandrel, a similar rotation is imparted to the work piece. The points of initial contact between the work rolls and the work piece are preferably at or as near as is physically possible to the center of the work piece.

As the mandrel and the work piece rotate, the work rolls are moved outward by suitable means in a direction more or less radial to and away from the center area of the work piece in such a manner that the paths of the points of contact between the work rolls and the work piece will be of a spiral nature. At the same time the pressure being exerted by the work roll against the work piece is of such nature and magnitude as to actually displace the metal of the work piece and force it progressively against the mandrel. This causes that surface of the work piece which is against the mandrel to assume the general configuration of the mandrel. This surface is conveniently referred to as the work face of the disc. The work face of the disc is generally the concave side of the disc.

The material of which the mandrel and work rolls are constructed should, of course, be of such a nature and possess such physical properties as hardness, toughness and resistance to wear and abrasion that they will not suffer undue wear and/or deformation during the formation of the disc.

While the disc is being formed in accordance with this invention, certain other things occur or can be made to occur which are of value and benefit. It is well known, for example, that by the working of certain metals such as some steels, displacement and deformation of the crystalline grain structure is induced. This can result under proper conditions in refinement of grain structure and hardening of the metal with an increase in tensile strength. The term "working" as used here is intended to mean the kneading or squeezing of the metal of the work piece and the resulting displacement and deformation thereof as the work piece is being acted upon by the work rolls and the mandrel. As a consequence of this working, the hardness, tensile strength and wear resistance of the metal are greatly enhanced and increased without having it acquire undue brittleness or loss of ductility.

The realization of the desirable physical properties brought about by working the metal of the work piece while the disc is being formed can be of such nature and magnitude as to obviate the necessity for heat treatment of the disc either entirely or at least to the extent and degree to which it is presently practiced in order to obtain the desired physical properties.

Another benefit to be derived from the working of the metal of an agricultural disc as described herein is that it permits of employing the relatively low cost strip rolled steel with results that will compare favorably with those obtained in agricultural discs presently being made of the more costly cross rolled steel. This stems from the fact that, as pointed out above, the path of contact of a work roll is of a spiral nature. It follows, therefore, that the direction of the working of the metal will also be in somewhat the same path. Thus, from a geometrical point of view, it is apparent that most of the time the distortion and displacement of the grain structure of the metal takes place transversely, in varying degrees, to the direction of rolling. This transverse working of the metal will, by its very nature, have the effect of neutralizing the initial directionality of the strip rolled base material.

The squeezing action exerted on the work piece when it is being formed between the work rolls and the mandrel will tend to reduce the thickness of the metal. The degree to which the thickness is reduced will be primarily a function of the degree, quantity and nature of actual pressure being exerted by the work rolls at the points of contact with the work piece.

It is possible, by varying these factors, to exercise control over the thickness of the disc. For example, a highly desirable type of agricultural disc is one in which the thickness tapers gradually from the original work piece thickness at or near the center to some appreciably lesser thickness at the outer periphery. This tends to enhance the resiliency of the disc.

By maintaining a more or less uniform roll pressure, so as to produce a somewhat uniform thickness throughout most of the working of the disc, and then effecting a sharp or drastic alteration of the roll pressure, when working the metal within a short distance of the outer periphery of the disc, so as to produce a rapid reduction in the thickness from that point to the periphery, it is possible to generate disc edges having substantially the same configurations as are presently being used without the necessity of bevel rolling or subsequent shaping and sharpening of the periphery as described above.

By making the necessary adjustments to the design of the mandrel and then carrying a drastic alteration of the working roll pressure through to the very edge of the work piece, it is possible to actually sever or pinch off any excess material at the outer edge. This makes it no longer necessary to first punch out a circular blank. Thus, a much less costly method of preparing the work piece is provided, since it is possible to fashion a blank by merely shearing off a piece of sufficient size which is initially roughly square or polygonal.

It is necessary in the utilization of many agricultural discs, especially plow discs, for the work face of the disc to attain what is termed "land polish" in order that the soil which is being plowed or tilled will slide over the surface and scour free in the proper manner without unduly adhering to the work face and thus cause malfunctioning of the implement. In order to assist in acquiring land polish, it is frequently the practice to prepare the work face of the disc by removing a small portion or layer of the relatively rough mill or "as rolled" surface metal. Previously, this has been done by means of abrasive grinding known as face polishing. More recently, this has sometimes been accomplished by the action of abrasive shot blasting. By either of these two means, a work face surface finish is obtained which will more readily take on the land polish with a minimum of field usage.

Provided the portions of the mandrel and the work rolls which come in contact with the work piece have a sufficiently smooth finish and texture, it is possible in working the metal in accordance with this invention to produce a disc having a work face of even superior nature and character of finish than is presently obtainable with current production practices. This is particularly true as the finish relates to the speed, readiness and ease with which land polish is acquired. Since this improvement of the work face finish of the disc is incidental to forming the disc in accordance with this invention, there is a resulting cost savings as a consequence of having eliminated the necessity for face polishing or shot blasting. Further, the work face finish of all discs produced by this method is thus benefited and a desirable improvement is brought to the work face of some categories of agricultural discs where face polishing or shot blasting was not previously practiced for economic reasons.

Various further and more specific objects, features and advantages of this invention will appear from the description taken in connection with the accompanying drawings which form a part of this specification and illustrate by example certain embodiments of this invention. The invention consists in such novel features and combinations as may be shown and described in connection with the method and apparatus herein disclosed.

In the drawings:

FIGS. 1 to 6, inc., are views in diametrical section of various types and shapes of argicultural discs which may be manufactured in accordance with the invention.

FIG. 7 is a view of a mandrel and work roll assembly for forming agricultaural discs in accordance with the invention, together with a disc blank assembled in the apparatus in operative relation for the initial stages of the forming operation.

FIG. 8 is a view similar to FIG. 7, but showing the disc blank at a later, partially formed stage; while FIG. 9 is a view at a still later stage of the forming operation when the shaping of the disc is substantially complete.

FIG. 10 is a view similar to FIG. 7 but showing the apparatus used to control one of the work rolls during the formation of the disc.

FIG. 11 is a view in diametric section showing a disc with a tapered cross section produced in accordance with the invention.

FIG. 12 is a diagrammatic plan view illustrating the directionality of a strip rolled work piece blank.

FIG. 13 is a similar view illustrating the effect on directionality of cross rolling a work piece blank.

FIG. 14 is a similar view illustrating the effect on the directionality of a strip rolled work piece blank worked in accordance with the present invention.

Referring to the drawings, FIG. 1 shows a standard type of spherical or single radius agricultural disc 10. A center hole 11 is provided for attaching the disc to an agricultural implement such as a harrow. The work face 12 of disc 10 is spherical. The outer portion 13 of the disc is beveled to a relatively sharp cutting edge 14 for ease of earth penetration.

Referring to FIG. 2, the work face 15 of the disc 16 has the shape of an ellipse with a major radius R–1 and a minor radius R–2. The disc is provided with a center hole 17 and has a beveled outer portion 18 forming a relatively sharp edge 19.

In FIG. 3, a disc 21 having a conical shape is provided with a centerhole 22 and has been formed with a relatively sharp peripheral at edge 23.

In FIG. 4, a disc 24 having a flat center 25 is shown. The portion between the flat center and the periphery has a work face 26 of spherical contour, beveled at 27 to provide a sharp cutting edge 28.

FIG. 5 shows an agricultural disc 30 having a flat raised center 31. The outer portion 32 has a work face of spherical contour, terminating in a sharp cutting edge 33.

FIG. 6 shows a flat agricultural disc 34 of the type known as a "coulter blade," which is beveled, as at 35, to provide a sharp cutting edge 36.

The present invention is ideally adapted to the production of agricultural discs in accordance with any of the FIGS. 1–6, inc. modifications as well as other shapes.

Referring now to FIGS. 7–9, inc., illustrative of an appropriate form of apparatus for practicing the invention, there is shown a mandrel 41 used in forming an agricultural disc from a flat work piece blank 42. The mandrel 41 is rotated by a shaft 43 driven by an electrical motor or other suitable means. Mandrel 41 has a convex surface 44 which is shaped to conform to the desired shape of the work face of the finished disc, such for example as any of the shapes in FIGS. 1–6, inc. In this particular embodiment, the surface 44 is spherical. Work piece blank 42 is secured to mandrel 41 by a screw or bolt 46 passing through the center hole of the blank. It is possible to dispense with bolt 46 and allow the work piece blank to be held against the mandrel by the pressure of the work rolls described below, but the use of bolt 46 facilitates positioning of the work piece blank at the start of the operation. Where desired, any suitable means may be used to fasten the work piece blank to the mandrel.

The actual shaping of the work piece blank into the finished disc is performed by work rolls 47 and 48. Work rolls 47 and 48 are hard steel rolls which are free to rotate about axles 49 and 51. The work rolls are pressed against the work piece blank 42 by frames 52 and 53 fastened to the axles 49 and 51. Any suitable means may be used to force the work rolls against the work piece blank and provide the movement hereinafter described during the formation of the finished disc.

At the start of the operation, the work rolls 47 and 48 are positioned as shown in FIG. 7. As the mandrel 41 rotates, the pressure of the work rolls against the work piece blank causes the work piece blank 42 to rotate with the mandrel 41 while the work rolls rotate about axles 49 and 51. As the operation progresses, the work rolls are gradually and progressively moved outward from the center of the work piece while still pressing the work piece against the mandrel. As a result, the work piece is forced to conform to the surface of the mandrel.

FIG. 8 shows the work piece 42 partially formed into a disc in the manner described. As the operation progresses, the work rolls move further away from the center of the work piece in a radial direction and the end result is that the work piece blank 42 is formed into an agricultural disc as shown in FIG. 9. If the work piece blank has excess material, e.g., if it is not circular or if it is larger than required, it is only necessary that the work rolls 47 and 48 continue to exert pressure as they reach the hard peripheral edge 45 of the surface 44 of the mandrel. When this is done, the excess material of the work piece blank is pinched off and a disc of the proper size remains.

In the employment of this process for making agricultural discs, it is not necessary that the disc have the same thickness throughout any substantial portion of its cross section. If desired, the disc may be varied in thickness from the center to the periphery by controlling the pressure exerted by the work rolls 47, 48, as by means of a fluid pressure actuated piston and cylinder assembly. As an example of what may be accomplished in this way, FIG. 11 shows an agricultural disc 54 having a center hole 56 and a periphery 57. As can be seen from FIG. 11, the cross section of disc 54 is tapered from a relatively thick portion near the center to a relatively sharp edge at the periphery 57. The inner or work face of disc 54 is spherical in shape. Tapering the disc in the manner shown in FIG. 11 provides a relatively sharp edge at the periphery 57 for cutting through the soil easily and, due to the gradual taper involved, provides a more resilient disc than merely beveling near the periphery to produce a sharp edge. Also if desired, the disc may be shaped to have a relatively constant thickness from its center to a point near its periphery and may then be reduced in thickness from that point to the periphery. In this way, a disc may be produced by the process of the invention, having a beveled edge without the necessity for subsequent cutting or grinding operations.

Any convenient means may be utilized during the working of the disc to produce a taper disc as described above. If, for instance, the pressure with which the work rolls are brought to bear against the work piece blank is increased as the work rolls move from the center portion towards the periphery of the work piece blank, the result is a disc having a thinner cross section where the pressure on the work rolls is increased. Alternatively, it is possible to increase the amount of working received by the metal of the work piece blank in a given area while maintaining a constant work roll pressure. This may be accomplished either by increasing the speed of rotation of the mandrel or by decreasing the radial speed with which the work rolls are moved from the center of the work piece blank towards the periphery.

FIG. 10 shows a mechanism manipulating work rolls 47, 48 of FIG. 7, in order to impart a desired contour in forming an agricultural disc. Referring to FIG. 10, the work roll frame 52 is supported and guided by guides 81 which are part of a work roll carriage 82. A hydraulic cylinder 83 is also mounted on work roll carriage 82. The work roll carriage 82 is supported and guided by ways 84 which are in fixed position with respect to the mandrel 41.

The direction of movement of the work roll carriage 82 with respect to ways 84 during formation of the disc is indicated by arrow 86; while direction of movement of the frame 52 with respect to the ways 84 and the work roll carriage 82 is indicated by arrow 85. The movement of work roll 47 is controlled by means of a template 88 having a contour 89 corresponding to the contour which is to be imparted to the surface of work piece blank 42 which is contacted by work roll 47. The path followed by work roll 47 is controlled by means of a tracer stylus 91 which is secured to work roll carriage 82 by means of a bracket 92. The movement of work roll 47 in the direction of the arrow 85 is controlled by a piston 93 which is connected to work roll frame 52 by a piston rod 87. The movement of piston 93 is controlled by the pressure of hydraulic fluid on either side of the piston in cylinder 83. Hydraulic fluid is passed to and from cylinder 83 through hoses 94 and 96. Hydraulic fluid is added to or withdrawn from the portions of cylinder 83 on either side of piston 93 in response to the actions of a tracer control valve 97 which controls the hydraulic pressure in the portions of the cylinder 83 served by hoses 94 and 96 so that work roll 47 forms the work piece blank 42 in conformance with the contour 89 which is traced by the stylus 91.

Movement of the work roll carriage 82 in the direction indicated by the arrow 86 is controlled by a control valve 98 which controls the flow of hydraulic fluid through hoses 99 and 101 to a hydraulic cylinder 102. The work roll carriage 82 is moved in the direction indicated by the arrow 86 by means of a piston 103 in hydraulic cylinder 102. Piston 103 is connected to work roll carriage 82 by a piston rod 104. Hydraulic fluid is supplied to and drained from control valve 98 by hoses 106 and 107.

In operation, the speed at which work roll 47 proceeds radially outward from the center of mandrel 41 is governed by adjusting the control valve 98 so as to achieve the desired rate of speed of the work roll carriage 82 with respect to the ways 84 in the direction indicated by the arrow 86. As the work roll carriage proceeds in the direction indicated by the arrow 86 the tracer stylus 91 is kept in contact with contour 89 of template 88. This results, through the action of the control valve 97 and piston 93, in the work roll 47 describing the desired path. As a result the surface of the work piece blank 42 which is in contact with the work roll 47 is shaped to correspond to the contour 89 of template 88. The other side of the work piece blank 42 is forced to correspond to the contour of surface 44 of the mandrel 41 due to the pressure of the work roll on the work piece blank. If a taper or bevel is desired in the finished disc, it is only necessary to use a template having the proper contour to achieve this result.

Although FIG. 10 shows apparatus for controlling only one work roll, it should be understood that additional work rolls can be controlled by similar apparatus. If desired, the same tracer stylus and template can control additional work rolls through the use of additional carriages, hydraulic cylinders, etc.

The particular apparatus shown in FIG. 10 is designed for forming an agricultural disc from a work piece blank which is at approximately room temperature or slightly above, i.e., so called "cold" working. It should be understood that the invention is equally applicable to the formation of discs from work piece blanks which are at higher temperatures, i.e., so called "hot" working.

FIG. 12 shows diagrammatically the directional characteristics of a work piece blank 58 punched out of strip rolled steel. The direction of rolling of blank 58 is indicated by lines such as 59. Work piece blank 58 is provided with a center hole 61. The direction of greatest strength of the work piece blank 58 is indicated by arrow 62 while the direction of least strength is indicated by an arrow 63. Owing to the directionality imparted by the rolling, the work piece blank 58 tends to tear or split more easily when forces are applied in the direction indicated by the arrow 63, than when forces are applied in the direction indicated by arrow 62.

FIG. 13 illustrates diagrammatically the neutralization of directionality by cross rolling the steel in a work piece blank 64 having a center hole 66. Work piece blank 64 was punched from steel which had been cross rolled, i.e., rolled in the directions indicated by arrows such as 67 and 68. As indicated by arrows 69 and 71, the work piece blank 64 resists tearing or splitting equally well in either of these directions.

FIG. 14 illustrates diagrammatically the effect on directionality of a work piece blank 72 having a center hole 73 when the work piece blank has been worked in accordance with this invention. The path of the work rolls in forming the work piece blank 72 into a finished disc is shown by line 74. Since the work rolls follow a roughly spiral path, as shown at 74, the directionality of the strip rolled steel used in work piece blank 72 is largely neutralized, and the finished disc thus has equal strength in all directions, as indicated by the arrows such as 76. The direction in which the steel forming work piece blank 72 was originally strip rolled is indicated by dotted lines such as 77.

While the invention has been described in detail with respect to certain preferred embodiments, it will be understood by those skilled in the art that various changes and modifications may be made without departing from the spirit and scope of the invention and it is intended to cover all such changes and modifications in the appended claim.

What is claimed is:

The method of producing an agricultural steel disc comprising the steps of placing a steel blank having unidirectional grain properties and developable area greater than the surface area of said disc between work roll means and a mandrel, said work roll means and mandrel each having a working surface of relatively smooth finish and texture for contact with said blank, and said mandrel having an outer peripheral cutting edge adjacent said mandrel surface, rotating said mandrel and blank while simultaneously pressing said work roll means surface against said blank and thereby into contact with said surface of the mandrel to conform the blank to the configuration of said mandrel surface, the area of contact between the work roll means surface and the blank progressing radially outward from the center area of the blank during formation of said disc and the action of the work roll means continuing past said outer peripheral cutting edge of the mandrel, and imparting substantially increased pressure of said work roll means surface against said blank when said area of contact therebetween has progressed to the vicinity of said outer peripheral cutting edge of the mandrel thereby to pinch off excess material of said blank and fully size said disc, whereby said disc has multidirectional grain properties and the work face of said disc has a high character finish approximating that of a "land polished" surface.

References Cited in the file of this patent

UNITED STATES PATENTS

| | | |
|---|---|---|
| 603,094 | Worth | Apr. 26, 1898 |
| 1,698,373 | Nelson | Jan. 8, 1929 |
| 1,788,382 | Cushwa | Jan. 13, 1931 |
| 1,968,296 | Hiester | July 31, 1934 |
| 1,977,309 | Jackson | Oct. 16, 1934 |
| 2,483,376 | Temple | Sept. 27, 1949 |
| 2,752,675 | Bauer | July 3, 1956 |
| 2,764,810 | Gardiner | Oct. 2, 1956 |

FOREIGN PATENTS

| | | |
|---|---|---|
| 2,109 | Great Britain | of 1894 |